Figure 1:
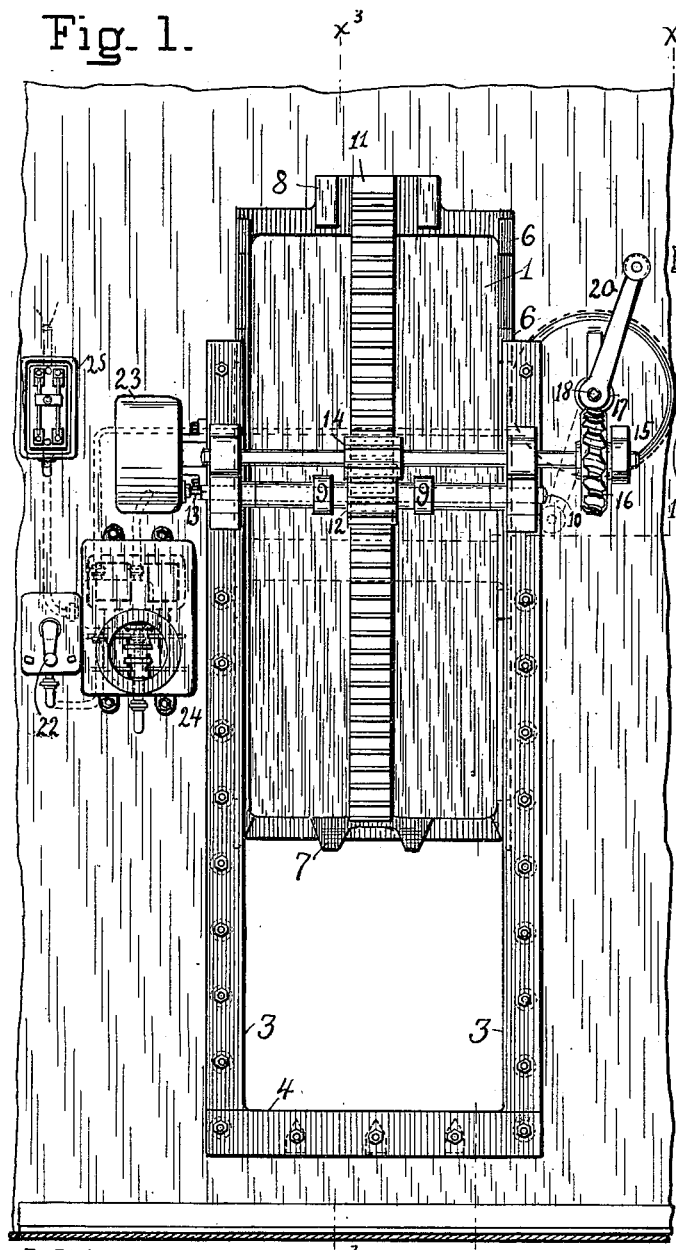

No. 651,004. Patented June 5, 1900.
F. T. BOWLES.
WATER TIGHT BULKHEAD DOOR.
(Application filed Dec. 23, 1899.)
(No Model.) 4 Sheets—Sheet 1.

Witnesses:
Samuel W. Balch
George H. Hill

Inventor
Francis T. Bowles,
by Thomas Ewing, Jr.
Attorney.

No. 651,004. Patented June 5, 1900.
F. T. BOWLES.
WATER TIGHT BULKHEAD DOOR.
(Application filed Dec. 23, 1899.)
(No Model.) 4 Sheets—Sheet 2.
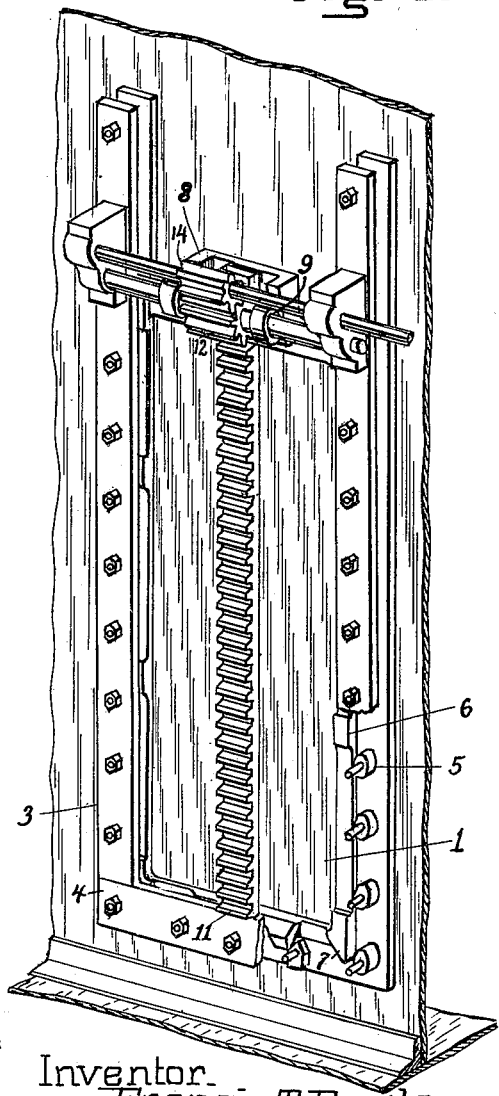
Witnesses—
Samuel W. Balch
George H. Hill
Inventor—
Francis T. Bowles
by Thomas Ewing, Jr.,
Attorney.

No. 651,004. Patented June 5, 1900.
F. T. BOWLES.
WATER TIGHT BULKHEAD DOOR.
(Application filed Dec. 23, 1899.)
(No Model.) 4 Sheets—Sheet 3.
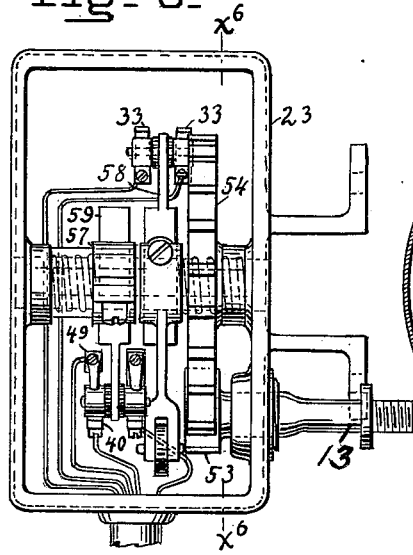
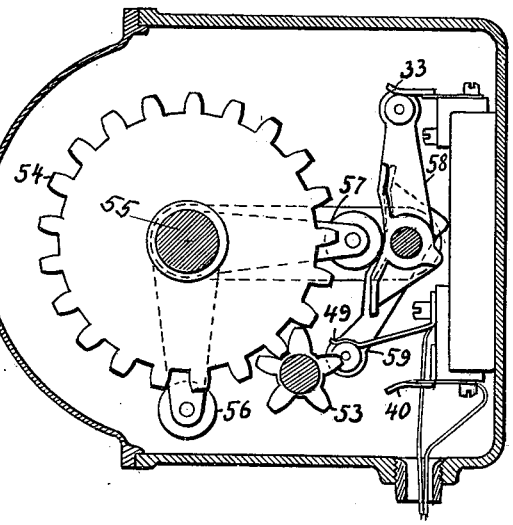
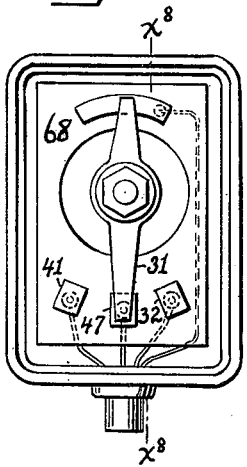
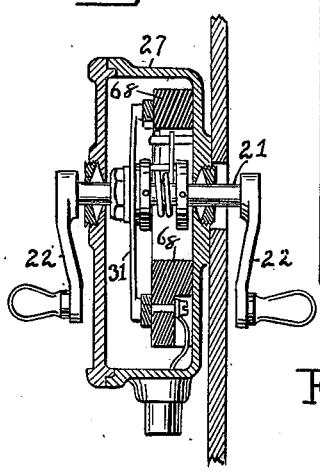
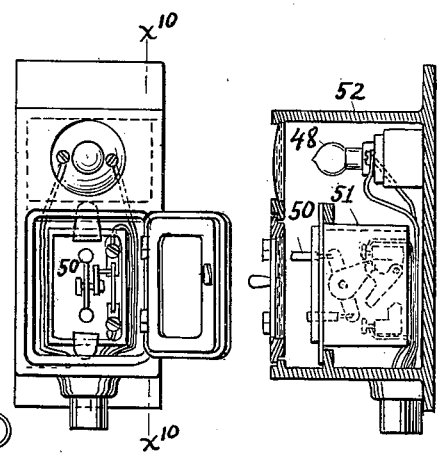
Witnesses:
Samuel W. Balch
George H. Hill
Inventor,
Francis T. Bowles,
by Thomas Ewing Jr.,
Attorney.

No. 651,004. Patented June 5, 1900.
F. T. BOWLES.
WATER TIGHT BULKHEAD DOOR.
(Application filed Dec. 23, 1899.)
(No Model.) 4 Sheets—Sheet 4.
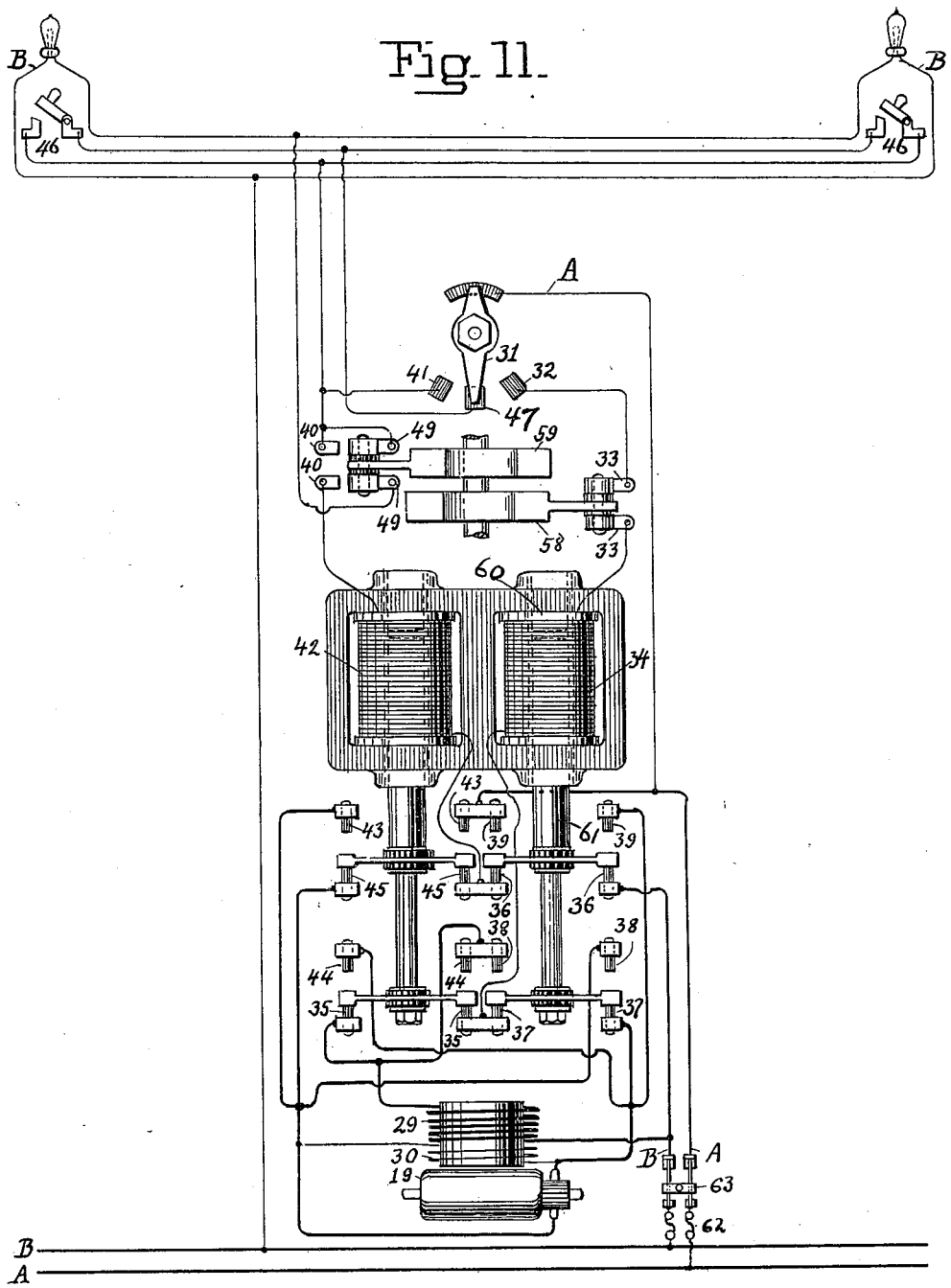
Witnesses:
Samuel W. Balch
George H. Hill
Inventor
Francis T. Bowles,
by Thomas Ewing, Jr.,
Attorney

UNITED STATES PATENT OFFICE.

FRANCIS TIFFANY BOWLES, OF NEW YORK, N. Y.

WATER-TIGHT BULKHEAD-DOOR.

SPECIFICATION forming part of Letters Patent No. 651,004, dated June 5, 1900.

Application filed December 23, 1899. Serial No. 741,418. (No model.)

*To all whom it may concern:*

Be it known that I, FRANCIS TIFFANY BOWLES, a citizen of the United States of America, and a resident of the city of New York, borough of Brooklyn, in the county of Kings, State of New York, have invented certain new and useful Improvements in Water-Tight Doors, of which the following is a specification, and for which provisional application for patent was filed in Great Britain the 14th day of November, 1899, No. 22,732, and application for patent was filed in France the 17th day of November, 1899, Serial No. 282,533, and in Germany the 16th day of November, 1899.

The invention is applicable to water-tight doors, fire-shutters, and other analogous structures. It is designed expressly for water-tight bulkhead-doors for ships and will for convenience be described with express reference thereto.

The general scheme is to provide a suitable water-tight door, electrical and manual means for operating it locally from both sides of the bulkhead, electrical means for operating the door from a distant point, as from the bridge or engine-room or from several such points, and to provide means local to the doorway for taking control of the door from the operator at a distant point, so that the door may be operated locally. As illustrated and described, the system is arranged so that the door may be opened and closed by the local operating means, but is only operated to be closed by the means located at points distant from the door. Provision is also made for giving a return signal at each point where the distant operating means is located, so that the operator may know that the door is closing properly.

The invention resides mainly in the construction of the door, the mechanism provided for operating it, and the manner of mounting such mechanism.

Figure 2:
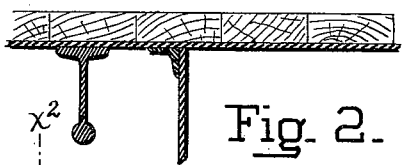

In the accompanying drawings, which form a part of this specification, Figure 1 is a front elevation of the bulkhead with a door and apparatus for moving the door properly mounted thereon, together with the means for local control of the door, the door being partly open. Fig. 2 is a section through the bulkhead on the line $x^2 x^2$ of Fig. 1. Fig. 3 is a section through the bulkhead on the line $x^3 x^3$ of Fig. 1. Fig. 4 is a perspective view of the bulkhead with the door mounted thereon and closed, the electrical operating means being omitted. Fig. 5 is a top view of the limit-switch box with the cover removed. Fig. 6 is a sectional view of the same on the line $x^6 x^6$ of Fig. 5. Fig. 7 is a front view of the control-switch box with the cover removed. Fig. 8 is a sectional view of the same on the line $x^8 x^8$ of Fig. 7. Fig. 9 is a front view of the emergency-switch with indicator, the door being open. Fig. 10 is a side view of the same on the line $x^{10} x^{10}$ of Fig. 9. Fig. 11 is a front view of the relays, together with a diagrammatic representation of the system of wiring, showing the electrical means for operating the door locally and from two distant points, means for taking away control from the different points, and means for giving the return signal at the distant points.

The construction and manner of operating each door locally will first be described, and then the means by which the doors can be operated from distant points will be described.

In Figs. 1, 2, and 3 the door 1 is shown about half-way open. The door is shown as moving vertically; but it is equally possible to move it horizontally or at any desired angle. The door is intended to fit the edge of the doorway with a water-tight joint. To accomplish this, a frame 2, which will be called the "rear guide," is bolted to the bulkhead around the four edges of the doorway on one side of the bulkhead. This rear guide is fitted against the bulkhead with a water-tight joint. Its outer surface, against which the door is intended to bear, is a plane surface, and the surface around the rim of the door on all four edges, which contacts with this rear guide, is also a plane surface, so that if the door is forced back against this rear guide it will close the doorway with a water-tight joint. This rear guide is called a "framing" for the doorway. Instead the doorway might be planed around its edges. To force the door back against the framing, there are provided guides, which will be called the "front" guides. There are two vertical front guides 3 3 and also a front guide 4, which extends along the bottom of the doorway. These front guides are properly distanced from the rear guide by distancing-pieces 5, which are collars upon the bolts by which the guides are bolted to the bulkhead. The two vertical front guides 3 3 are inclined slightly from top to bottom with respect to the vertical portions of the rear guide, the front and rear guides being farther apart at the top than at the bottom. Along the vertical portions of the rim of the door next to the front guide are a number of raised bosses 6, intended to engage with the front vertical guides. These bosses have inclined surfaces which are parallel to the surfaces of the front vertical guides with which they engage, and the contacting surfaces of the bosses and these front vertical guides are planed to fit. By this construction the door is free to move up and down between the rear and front vertical guides; but when the door is closed these bosses 6 will bear against the front vertical guides 3 3, with the result that the door, because of the wedge shape of the contacting surfaces, will be forced back against the rear guide 2. This provides for forcing the door back along the vertical portions of its rim. To force the rim at the bottom of the door against the rear guide, lugs 7 7 are attached at the bottom of the door, having wedge-surfaces which at their top when the door is closed engage the front guide 4, which is made separate from the vertical guides 3 3. They are pointed at their bottom, so as to cut through any material, as coal, which may be lodged on the door-sill. The front guide 4 at the bottom of the doorway is set at an angle to the rear guide 2, being closer to it above than below, (the distance thus increasing in the direction of motion of the door in closing,) so as to prevent the accumulation of material between the guides at the bottom of the doorway and to permit any material, such as coal, which may accumulate there, to be pushed out from between the guides by the door in closing. To facilitate this, the distancing-pieces between the guides at the bottom of the doorway have knife-edges at their tops and leave clearance between the front guide and the rear guide or framing. To force the portion of the rim at the top of the door against the rear guide, there is provided at the top of the door and on either side of the middle vertical axis thereof wedge-surfaces 8 8, tapered from the top downward, which are intended to run underneath rollers 9 9, mounted on a shaft 10, extended across the top of the doorway, as will be more fully described hereinafter. Thus engaging wedge-surfaces are provided around the entire rim of the door and doorway to force the four edges of the door back against the rear guide and make a water-tight joint when the door is closed. Moreover, since the front guides are made of four separate parts they may be adjusted independently by means of distancing-pieces and liners or washers, so as to secure proper sealing of the door along each edge.

Along the middle vertical axis of the door a rack 11 is attached, which engages with a pinion 12, mounted rigidly on the horizontal shaft 10. This shaft 10 is supported in brackets mounted on either side and near the top of the doorway. Attached to one end of the shaft 10 is a spindle 13, which operates the limit-switches, to be hereinafter described. In engagement with pinion 12 is another pinion 14, which is mounted upon a horizontal shaft 15, also supported in brackets on either side of the doorway near the top. This second shaft 15 carries on one end a worm-wheel 16, which meshes with a worm or other gear 17 on the power-shaft 18. Beyond the worm-wheel 16 to the right is an outboard-bearing.

The power-shaft 18 of the system is the axle of the armature 19 of an electric motor. The motor is mounted on the bulkhead at right angles thereto in a water-tight box, as shown in Fig. 2, its shaft 18 passing through the bulkhead. Each end of the power-shaft is squared, so that a crank 20 can be fitted upon it to operate the door up and down manually. As the power-shaft 18 extends through the bulkhead, the door can be thus operated manually from either side of the bulkhead. The spindle 21, on which is mounted the handle for operating the local-control switch, extends through the bulkhead and a handle 22 is attached to each end, so that the door can be operated from either side of the bulkhead electrically as well as manually through the motor-shaft.

Conveniently disposed on the bulkhead near the doorway are water-tight boxes, in which the various pieces of electrical apparatus necessary for operating the door electrically are mounted and protected. These are the box 23, which contains the limit-switches; the box 24, which contains the relays; the box 25, which contains a switch and fuses through which all of the system local to the door is connected to the mains A B; the junction-box 26, and the box 27, which contains the local-control switch. The wires are carried between the boxes through pipes 28. These various boxes and the parts inclosed in them are illustrated in detail in Figs. 3 to 11.

The electrical system for operating the doors locally will now be described.

Fig. 11 illustrates the system for operating a single door locally by means of the local-control switch. This switch is shown as closed in its middle position upon a contact, through which connection is had to the distant points of operation, the electrical system being shown with its various parts in the position in which it is when the door is closed. The motor has a compound field, one field-coil 29 being in series with the armature and the other, 30, in shunt with the armature. When the motor is operating to open the door, the series field alone is energized. When the motor is operating to close the door, both coils are connected in circuit. The purpose of the shunt-field is to preserve the field strength of the motor and cause it to move the door more slowly in closing than in opening and to give the motor more power, so that it may overcome any obstacle to closure of the door. When the local-control switch is thrown to the right hand in Fig. 11, contact is made from one of the mains A through one side of a double-pole knife-switch, whereby the whole system can be connected to and disconnected from the mains, thence through the switch-arm 31 and contact 32 of the local-control switch and the upper limit-switch 33, (which is closed, except when the door is completely opened,) thence through the coil of the up relay 34 and thence through contact 35 of the circuit-closer controlled by the down relay, through the series coil 29 of the field-magnet and thence to the other main B. The up relay is thus energized. The two pairs of normally-closed contacts 36 and 37 controlled thereby are opened, and immediately afterward the two pairs of normally-open contacts 38 and 39 controlled thereby are closed. After this change is made the circuit through the local-control switch, the up relay, and the upper-limit switch is maintained and the following circuits are also completed: from one of the mains A, through contacts 39, through the armature 19 of the motor, through contacts 38, through the series coil 29 of the field-magnet, and thence to the other main B. The motor will then start to run, and will continue until the local-control switch is opened, thus opening the circuits of the up relay or the upper limit of travel of the door is reached, when the upper-limit switch will be thrown by means to be hereinafter described, and will open the up-relay circuit, thereby causing the opening of the rest of the circuits. As soon as the door starts to open the lower-limit switch 40 is also closed. If while the lower-limit switch is closed the local-control switch is thrown to the left, and thereby closed on the down side, a circuit will be established from one of the mains A through contacts 31 41 of the local-control switch, through the lower-limit switch 40 and down relay 42, through contacts 36 of the up relay, and thence to the other main B. The down relay is then operated, and the two normally-open pairs of contacts 43 and 44 controlled thereby are closed. The motor-circuits established thereby are as follows: from one of the mains A through contacts 43 of the down relay by one path through the shunt-field coils 30 and by another path through contacts 43 of the down relay, and thence through the motor-armature in the opposite direction to that before stated, thence through contacts 44 of the down relay, and thence through the series-field coils 29 of the motor in the same direction as that before stated to the other main. The door will then run until the local-control switch is opened or until the lower limit of travel of the door is reached, when the down relay is opened and thereby the motor-circuits are opened, as above described. When the operator releases the handle of the local-control switch or the lower-limit switch is opened, the down-relay circuit is broken and the relay drops, breaking the operating motor-circuits theretofore established and opening the circuit through the shunt-field coil, but immediately closing a local circuit through the armature and the series-field coil, as follows: from the motor-armature 19 across contacts 37 and 35, through the series-field coil 29 in the same direction that current flows when the operative down circuits are closed, through contacts 36, and the lower normally-closed contacts 35 of the down relay to the other side of the motor-armature. So long as the motor continues to move (owing to the momentum of door, armature, &c.) current will be generated in the motor, which flows through its own series-field coil. This causes the motor to act as a dynamic brake and will quickly bring the moving parts of the system to a stop, at which time the current ceases to flow. The same action occurs also and the same circuits are made when the up-relay circuit is broken either at the operator's switch or the upper-limit switch. In this case the current generated by the motor flows through the series-field coil in the opposite direction to that in which it flows when the operative up circuits are closed and the door is moving up, and as the time interval necessary to reverse the field is greater than that occupied by the moving system in coming to stop by gravity alone practically no current flows in this case.

The control of the door from distant points will now be described.

Fig. 11 shows two emergency-switches 46 for operating the door from two distant points. The closure of an emergency-switch merely effects the closure of the down-relay circuit already described through the middle contact 47 of the local-control switch for the door. It is therefore impossible to operate the door from an emergency-switch unless the local-control switch for that door is in middle position, and any person at the door wishing to operate it himself and take all control away from the distant points of operation can prevent its operation from an emergency-switch and assume entire control of the door by opening the middle contact of the local-control switch. In order that upon closure of an emergency-switch the operator may know that the system is in proper working order, a signal-lamp 48 is provided at each emergency-switch which lights when the lower-limit switch is operated on closure of the door. It remains lighted until the emergency-switch is opened and can be relighted upon closure of the emergency-switch for inspection. This is effected through signal-contacts 49, which are provided on the lower-limit switch and are operated by the shaft which operates the door. These signal-contacts are opened when the relay-contacts 40 of the lower-limit switch are closed upon the door starting to open and are closed when these relay-contacts are opened upon the closure of the door. The circuit through the lamp is as follows: from one of the mains A through contacts 31 47 of the local-control switch, thence through the emergency-switch 46, thence through signal-contacts 49 of the lower-limit switch, and thence through the signal-lamp 48 to the main B. The signal-lamp is lighted when the door closes, whether the door is being operated from the emergency-switch or by the local-control switch. The emergency-switches and signal-lamps shown in the diagram Fig. 11 are illustrated in Figs. 9 and 10. Each consists of a single-point switch with a push-button 50 to close it and another to open it, such as is used in electric-lighting circuits, the switch being an ordinary snap-switch. It is mounted in a suitable porcelain box 51. The porcelain box is placed in a water-tight casing 52, in which is also placed the signal-lamp.

The mechanism for closing and opening the limit-switches will now be described. It is illustrated in Figs. 5 and 6 in the position which it takes when the door is closed. The limit-switches are operated by a spindle 13, provided with a screw end, whereby it may be coupled to shaft 10. This spindle passes through a stuffing-box in the side of the box 23, that incloses the limit-switch mechanism. On the end of the spindle, inside the casing, is a pinion 53, which meshes with a gear-wheel 54, mounted rigidly upon a shaft 55, upon which are also mounted two arms 56 57 at some suitable angle. On the ends of these arms are rollers to engage with and throw the switch-arms 58 59 of the limit-switches. These switch-arms and the arms for operating them are mounted in different vertical planes, so that one is operated by one of the arms and not by the other, and vice versa. The shaft 55 is revolved less than one revolution while the door is moved through its entire path or range of travel, and the arms are set on the shaft in such way that one of the arms, 56, will engage with and throw the upper-limit-switch arm 58 when the door reaches the upper limit of its travel and the other arm, 57, will engage with the lower-limit-switch arm 59 when the door reaches the lower limit of its travel, each arm 56 59 as it moves away from such extreme position closing or permitting the closure of its appropriate limit-switch.

The relays are illustrated in Fig. 11. They are provided with iron-clad magnets. An iron core 60 projects downward, so as to increase the attraction for the plunger 61. Each plunger carries two contact-arms of spring sheet phosphor-bronze, insulated from it but rigidly fastened to it. The contact-studs carry adjustable carbon blocks, against which the contacts on the phosphor-bronze springs impinge. They are inclosed in a box 24, (shown in Fig. 1,) which has a removable glass window to provide for inspecting the contacts and for adjusting them.

The switch and fuses illustrated in Fig. 1 are contained in the water-tight box 25. The wires from the mains are led into the casing at the bottom and are attached to binding-posts near the top, mounted on a plate of insulating material. Thence the circuit is through fuses 62 to the double-pole knife-switch and through the switch and switch-hinges to the wires leading to the circuits for operating the door. The blades of the knife-switch are attached through hinge connections to a cross-bar 63, of insulating material. This bar is attached to a plunger-rod, one end of which passes through a stuffing-box in the cover of the box 25 and the other end of which passes through a stuffing-box in the back thereof to the other side of the bulkhead. By means of this rod the switch can be operated from either side of the bulkhead. The wires from all of the other boxes are led to the junction-box 26, where the proper connections are effected.

The local-control switch (illustrated in Figs. 7 and 8) is provided with a plate of insulating material 68, on which the contacts are mounted. A switch shaft or spindle passes through stuffing-boxes on the top and bottom of the box 27 and carries a contact-finger 31, which is moved over the contacts by turning the spindle by the handles 22, mounted upon each end of the spindle. The end of the spindle, which passes through the bottom of the box 27, also passes through the bulkhead, so that the switch can be operated from either side of the bulkhead. A spring is coiled around the spindle and the ends of the spring lie on opposite sides of two pins, one of which is through collars on the spindle and the other of which is supported by the casing. The spring returns the switch when released by the hand to a definite position—viz., the middle position—thus automatically closing and holding the switch normally closed at contact 47, which is included in the circuits with the emergency-switches, through which the door operates electrically from the distant points of control.

It is obvious that many changes can be made without departing from the spirit of my invention.

Therefore what I claim, and desire to secure by Letters Patent of the United States, is—

1. The combination of a door, a framing for the doorway, a driving-shaft extending across the door, wedges on the door and engaging rollers on the shaft to hold the door against the framing, substantially as described.

2. The combination of a door, a framing for the doorway, wedges on the door, and a guide to engage with the wedges, the guide being separated from the framing by a distance which increases in the direction of motion of the door in closing, substantially as described.

3. The combination of a door, a framing for the doorway, wedges along the lower edge of the door, a guide along the lower edge of the doorway to engage with the wedges, and distance-pieces between the guide and the framing, so shaped and positioned as to leave clearance between the guide and framing, substantially as described.

4. The combination of a water-tight door mounted in a bulkhead, and an electric motor and suitable gearing for operating the door, the motor-shaft passing through the bulkhead, substantially as described.

5. The combination of a water-tight door mounted in a bulkhead, an electric motor and suitable gearing for operating the door, the motor-shaft passing through the bulkhead, and means for operating the door manually, through the motor-shaft, from either side of the bulkhead, substantially as described.

6. The combination of a water-tight door mounted in a bulkhead, an electric motor and suitable gearing for operating the door, the motor-shaft passing through the bulkhead, and means for operating the door, both manually and electrically, through the motor-shaft, from either side of the bulkhead, substantially as described.

Signed by me at New York, Brooklyn, this 16th day of December, 1899.

FRANCIS TIFFANY BOWLES.

Witnesses:
CHAS. F. HINCKLEY, Jr.,
JOHN J. SULLIVAN.